US011956374B2

(12) United States Patent
Cárdenes Cabré et al.

(10) Patent No.: US 11,956,374 B2
(45) Date of Patent: Apr. 9, 2024

(54) CRYPTOGRAPHIC SIGNATURE DELEGATION

(71) Applicant: Via Science, Inc., Somerville, MA (US)

(72) Inventors: Jesús Alejandro Cárdenes Cabré, Montreal (CA); Arteum Kanda, Pierrefonds (CA); Jeremy Taylor, Montreal (CA); John Christopher Muddle, Barcelona (ES); Kai Chung Cheung, Markham (CA)

(73) Assignee: Via Science, Inc., Somerville, MA (US)

( * ) Notice: Subject to any disclaimer, the term of this patent is extended or adjusted under 35 U.S.C. 154(b) by 0 days.

(21) Appl. No.: 18/134,814

(22) Filed: Apr. 14, 2023

(65) Prior Publication Data
US 2023/0336361 A1 Oct. 19, 2023

Related U.S. Application Data

(60) Provisional application No. 63/331,491, filed on Apr. 15, 2022.

(51) Int. Cl.
*H04L 9/32* (2006.01)
*H04L 9/00* (2022.01)
(52) U.S. Cl.
CPC .......... *H04L 9/3247* (2013.01); *H04L 9/3213* (2013.01); *H04L 9/50* (2022.05)
(58) Field of Classification Search
CPC .................................................... H04L 9/3247
See application file for complete search history.

(56) References Cited

U.S. PATENT DOCUMENTS

| 6,028,938 | A  | * | 2/2000 | Malkin | H04L 9/321 380/243 |
| 9,331,856 | B1 | * | 5/2016 | Song | G06F 21/36 |
| 11,676,133 | B2 |   | 6/2023 | Kim | |
| 2003/0093678 | A1 | * | 5/2003 | Bowe | H04L 9/3236 713/180 |
| 2017/0046689 | A1 | * | 2/2017 | Lohe | G06Q 20/065 |
| 2019/0034919 | A1 | * | 1/2019 | Nolan | G06Q 20/389 |

(Continued)

OTHER PUBLICATIONS

International Search Report and Written Opinion dated Jul. 25, 2023 for International Patent Application No. PCT/US2023/018651 filed on Apr. 14, 2023.

*Primary Examiner* — Ponnoreay Pich
(74) *Attorney, Agent, or Firm* — Pierce Atwood LLP

(57) ABSTRACT

A computing system that is configured for a federated wallet with cryptographically secure signature delegation. The system may be configured to receive a session public key corresponding to a decentralized application and a user. The system may be further configured to receive an unsigned transaction of a blockchain, the unsigned transaction corresponding to the user. The system may be further configured to provide a symmetric encryption key to the user's device for encrypting the user's private signing key. The system may be further configured to determine, using the session public key, that the unsigned transaction is valid. Based on the validity of the unsigned transaction, the system may send the unsigned transaction to the user's device. The system may send the symmetric encryption key to the user's device to decrypt the private signing key. The system may be further configured to receive a signed transaction for submission to the blockchain.

20 Claims, 10 Drawing Sheets

(56) References Cited

U.S. PATENT DOCUMENTS

| | | | |
|---|---|---|---|
| 2019/0327218 A1* | 10/2019 | Altenhofen | H04L 63/0471 |
| 2021/0056541 A1* | 2/2021 | Kim | G06Q 20/3276 |
| 2021/0097528 A1* | 4/2021 | Wang | H04L 9/30 |
| 2021/0377045 A1* | 12/2021 | Doney | G06F 21/62 |
| 2023/0336361 A1* | 10/2023 | Cárdenes Cabré | H04L 9/3247 |

\* cited by examiner

CRYPTOGRAPHIC SIGNATURE DELEGATION

CROSS-REFERENCE TO RELATED APPLICATION DATA

This application claims the benefit of and priority to U.S. Provisional Patent Application No. 63/331,491, filed Apr. 15, 2022, and entitled "Cryptographic Signature Delegation," in the name of Jesús Alejandro Cárdenes Cabré, et al. The above provisional application is herein incorporated by reference in its entirety.

BACKGROUND

Data security and encryption is a branch of computer science that relates to protecting information from disclosure to other systems and allowing only an intended system access to that information. The data may be encrypted using various techniques, such as public/private key cryptography (such as elliptic cryptography and quantum resistant cryptographic schemes based on lattice cryptography, among others), and may be decrypted by the intended recipient using a shared public key and a private key and/or other corresponding decryption technique. Transmission of the data is protected from being decrypted by other systems at least by their lack of possession of the encryption information.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

SUMMARY

Figure 1A:
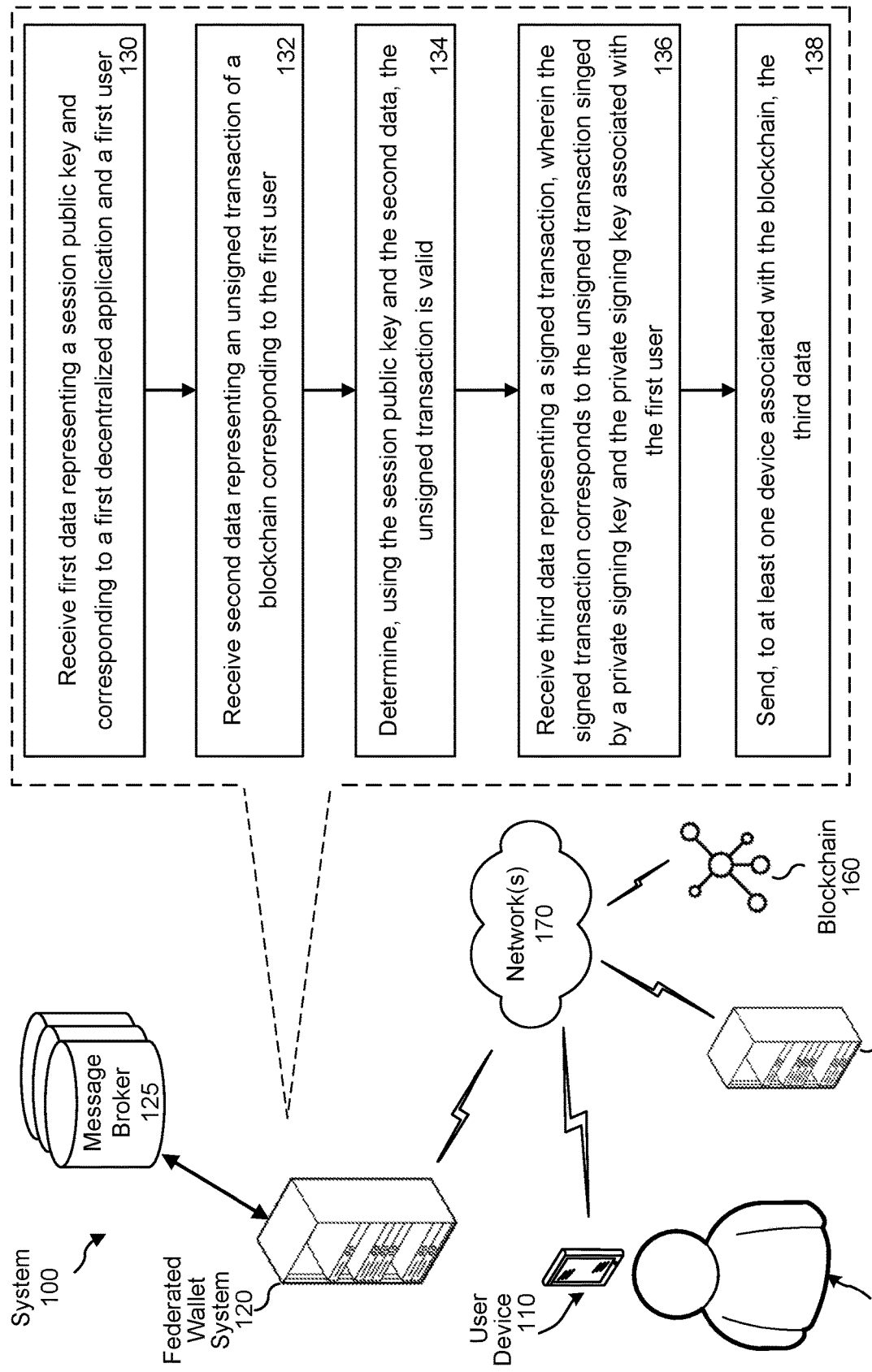
FIG. 1A illustrates a system for a federated wallet with cryptographically secure signature delegation, in accordance with some embodiments of the present disclosure.

A system and method for a federated wallet with cryptographically secure signature delegation. The system receives first data representing a session public key and corresponding to a first decentralized application and a first user. The system receives second data representing an unsigned transaction of a blockchain and corresponding to the first user. The system determines, using the session public key and the second data, that the unsigned transaction is valid. The system receives third data representing a signed transaction, wherein the signed transaction corresponds to the unsigned transaction signed by a private signing key associated with the first user. The system sends, to at least one device associated with the blockchain, the third data.

DETAILED DESCRIPTION

Web3 is the next evolution of the World Wide Web and based on interconnected decentralized applications (dapps) and powered by blockchain computing architecture. Web3 is based on a trustless system using incentives and economic mechanisms instead of relying on trusted third-parties. Instead of large portions of the Internet being controlled or owned by centralized entities, ownership in Web3 is distributed, thus decentralized, amongst the builders and users. However, limitations may exist, such as a user being limited to authentication on one device at a time.

A dapp, such as UniSwap or Upland, is an application that runs or operates without a centralized entity to control it, but instead operates on decentralized computing, such as a blockchain, or other network of computers rather than relying on a single computer. The dapp may operate autonomously through the use of smart contracts. A smart contract may be a program that is stored on a blockchain and is executed when certain predetermined conditions are met. The smart contract may automate an agreement based on the conditions without the need of an intermediary for the agreement. Thus, participants of the smart contract are assured of the appropriate outcome as long as the conditions are met. In some embodiments, the blockchain may be an application programming interface (API) and a transaction may correspond to an interaction with the API.

Interactions with a blockchain may include queries, retrievals, and transactions. A transaction is an interaction that modifies the state of the blockchain. While some blockchain transactions may be monetary, such as cryptocurrency, blockchain transactions may encompass a wide range of applications for tracking immutable information. This may include healthcare records, monitoring supply chains, and using smart contracts to send notifications, initiate support tickets, or registering a product.

Offered is a technique and architecture that allows access to a variety of authenticated and protected transactions (such as those involving a block chain) using a single sign on. This approach may be referred to as a federated wallet. The federated wallet described herein corresponds to data and computing configurations/approaches that provide to users a decentralized system that does not correspond to a particular device of the user and allows the user to conduct transactions with multiple dapps from a single sign on. Additionally, the federated wallet provides for a user to access and sign queued meta-transactions from any device the user has been authenticated with through the single sign on (SSO) process. Finally, the federated wallet incorporates a federation of authenticators requiring for some transactions a minimum number of (possibly randomly selected) authenticators to approve and/or sign the transaction before or after the transaction is signed by the user for execution/submission. The systems and methods described herein may be applied to or compatible with quantum computing resistant algorithms, such as a stateless post-quantum hash-based signature scheme (SPHINCS+), or any other implementation of a post quantum signature.

FIG. 1A illustrates a system for a federated wallet with cryptographically secure signature delegation, in accordance with some embodiments of the present disclosure. The illustrated system 100 may include a network 170. The network 170 may include the Internet and/or any other wide- or local-area network, and may include wired, wireless, and/or cellular network hardware. A user device 110, that receives input from a user 105, may communicate, via the network 170, with a federated wallet system 120. The device 110 and the federated wallet system 120 may communicate with a blockchain 160, such as a blockchain database, which itself may include a plurality of devices. The federated wallet system 120 may communicate with a message broker 125. The message broker may be a database or relay service used for queuing meta-transactions associated with the federated wallet system 120.

The blockchain 160 may use blockchain technology, as one of skill in the art will understand, to maintain a public ledger of information. The blockchain 160 may be an example of a distributed consensus mechanism. As a public ledger that is a source of consensus of contents a blockchain may be considered non-refutable. The blockchain database(s) may involve many different physical machines that each store all or some portion of the blockchain data. A trusted authority, as part of a blockchain 160, may be a determination of a source of a message to determine the provider/attester of a specific piece of information. Group signatures to the blockchain 160 may be used to allow members of specific groups to attest to a specific fact without revealing an individual member's identity.

The federated wallet system 120 may include different components such as a federated wallet component as the front end and a Custom User Management (CustomUM) component as the backend. The federated wallet component and the CustomUM component may be executed on one computing system or may be on separate computing systems that comprise the federated wallet system 120. The message broker 125 may be centralized as part of the federated wallet system 120 or may be decentralized, such as part of a blockchain or a third-party service. In some embodiments, the CustomUM component may communicate with a database that stores identifications for uniform resource locators (URLs) or dapps, such as allowlists or blocklists, that may be used to verify permissible URLs and dapps and block malicious (or unapproved) URLs and dapps. The user device 110 interface with one or more dapps (illustrated as dapp 115 in FIG. 1A), generating transactions and executing smart contracts.

The user 105 may use the user device 110 to login to the federated wallet system 120. The federated wallet system 120 may perform an authentication process to verify the user 105 and generate an SSO token, as described below in reference to FIG. 2. The user 105 may use the user device 110 to access a dapp 115 and the user device 110 may provide the SSO token to the dapp 115 for verification by the dapp 115.

Figure 1B:
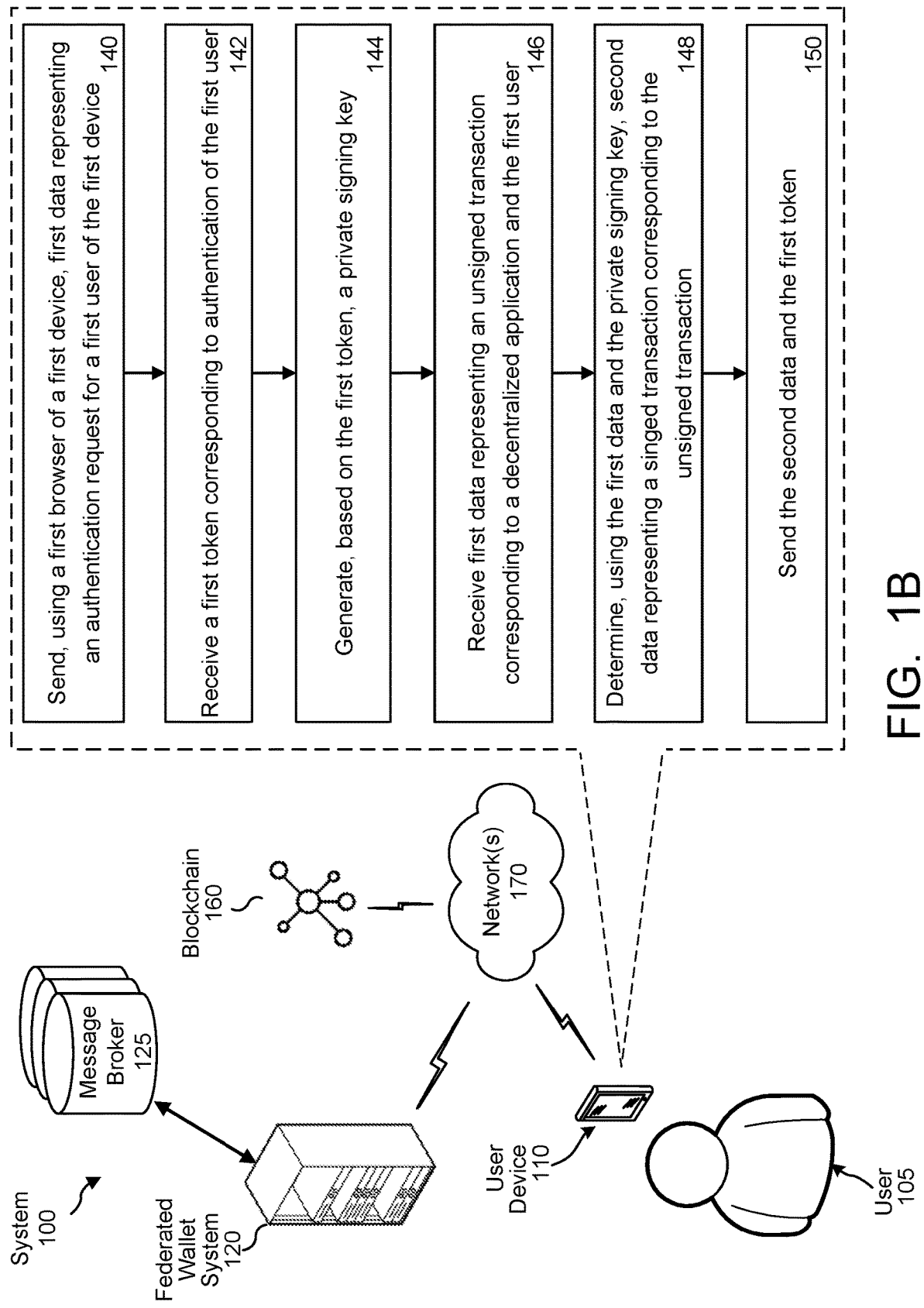
FIG. 1B illustrates a device interfacing with the federated wallet with cryptographically secure signature delegation, in accordance with some embodiments of the present disclosure.

As shown in FIGS. 1A and 1B, the federated wallet system 120 may be configured to receive (130), from the dapp 115, a session public key that corresponds to the user 105. The federated wallet system 120 may store the session public key to verify transactions received from the dapp 115. The dapp 115 may provide an interface to the user device 110. The user 105 may, using the interface of the dapp 115, generate a transaction. The federated wallet system 120 may be configured to receive (132), from the dapp 115, an unsigned transaction for the blockchain 160 and corresponding to the user 105. The federated wallet system 120 may store the unsigned transaction with the message broker 125.

The user device 110 may request from federated wallet system 120 pending unsigned transactions for the user 105, such as unsigned transactions stored in the message broker 125. The federated wallet system 120 may determine (134), using the session public key, that the one or more unsigned transactions are valid. The federated wallet system 120 may send the validated unsigned transactions to the user device 110. Additionally, if the federated wallet system 120 determines one or more of the unsigned transaction are invalid, the federated wallet system 120 may send a notification to the user device 110 that identifies the invalid unsigned transactions.

The user 105, using the user device 110, may sign, using a private signing key associated with the user 105 (and as described in reference to FIG. 5), the validated unsigned transactions and send the signed transactions to the federated wallet system 120. The federated wallet system 120 may receive (136) the one or more signed transactions from the user device 110. The federated wallet system 120 may execute the one or more signed transactions by entering (138) the signed transactions to the blockchain 160.

FIG. 1B illustrates a device interfacing with the federated wallet with cryptographically secure signature delegation, in accordance with some embodiments of the present disclosure. As described above in reference to FIG. 1A, the user device 110 may authenticate and execute transactions via the federated wallet system 120. The user device 110 via a first browser may send (140), to the federated wallet system 120, an authentication request to perform SSO for the user 105 and the user device 110. As described below in reference to FIG. 2, the user 105 may be authenticated through SSO and the user device 110 may receive (142) an SSO token authenticating the user 105 and the user device 110.

The user device 110 may generate (144) a private signing key based on the SSO token. The user device 110 may receive, from the federated wallet system 120, a symmetric encryption key and encrypt the private signing key, as described below in reference to FIG. 3. The user device 110 may destroy the symmetric encryption key after encrypting the private signing key.

The user 105, using the user device 110, may interface with one or more dapps 115 and generate unsigned transactions. The federated wallet system 120 may receive the unsigned transactions and store the unsigned transaction in the message broker 125. The user device 110 may request the pending unsigned transactions from the federated wallet system 120. The user device 110 may receive (146) one or more unsigned transactions corresponding to the user and one or more dapps 115.

The user 105, using the user device 110, may sign (148) the one or more unsigned transactions using the private signing key. The user device 110 may request and receive the symmetric encryption key from the federated wallet system 120 and decrypt the private signing key using the symmetric encryption key before signing the transactions. The user device 110 may send (150) the one or more signed transactions and the SSO token to the federated wallet system 120 to review and execute the transactions on the blockchain 160.

Figure 2:
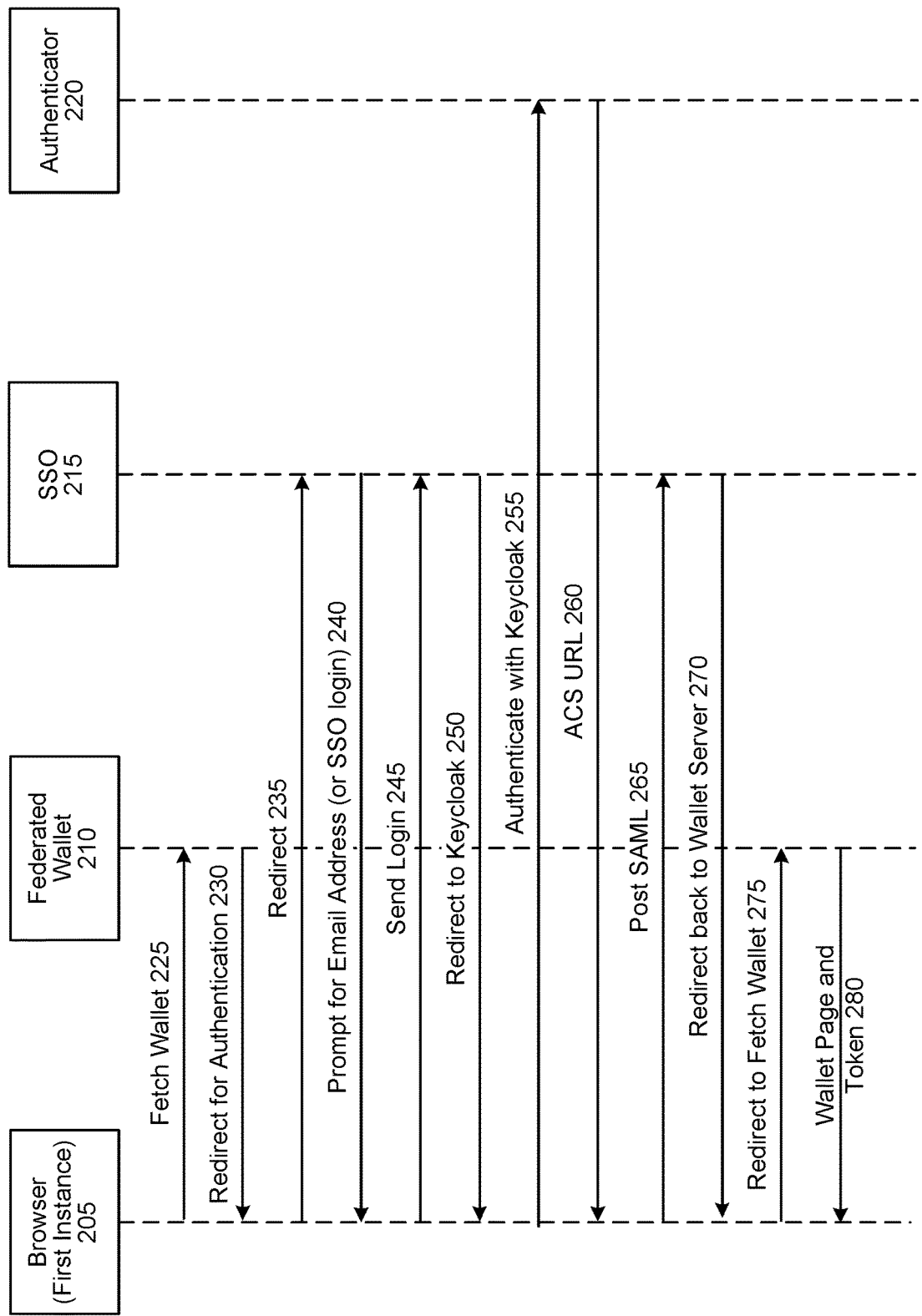
FIG. 2 illustrates an example process for single sign on with a federated wallet, in accordance with some embodiments.

FIG. 2 illustrates an example process for single sign on with a federated wallet, in accordance with some embodiments. A user 105 may use a web browser 205 on a computing device 110 (e.g., desktop computer, laptop, mobile phone, tablet, etc.) to access their federated wallet. The federated wallet may initiate a SSO process such that the authenticated user may access and be authenticated for multiple dapps for the session established by the SSO.

The user 105 may initiate, via the browser 205, a SSO request to a federated wallet component 210 of the federated wallet system 120. The browser 205 may send a request (225) to fetch the wallet for the user 105 from the federated wallet component 210 for display and interaction by the browser 205. The federated wallet component 210 may redirect for authentication 230 the request to the browser, directing the browser 205 to the SSO server 215. The browser 205 may send the redirection (235) to the SSO server 215. The SSO server 215 may then send a request (240) back to the browser 205 that prompts the user 105 for their SSO login, such as an email address.

The browser 205 may send (245) the SSO login provided by the user 105 to the SSO server 215. Based on receiving the SSO login information, the SSO server 215 redirects a request (250) to authenticate the user 105 back to the browser 205. The authentication request (250) includes instruction for the browser 205 to send (255) an authentication request to an authentication server 220, such as a third-party authenticator (e.g., KeyCloak). The authentication server 220 may be a third-party service that enforces authentication given the SSO identity provided. In some embodiments, strong end-user authentication may be achieved through biometric authentication or authenticated hardware. The authentication server 220 may create a Security Assertion Markup Language (SAML) assertion for the SSO server 215 and post it to an assertion consumer service (ACS). The authentication server 220 may send (260) the ACS uniform resource locator (URL) to the browser 205. The browser 205 may access the SAML assertion using the ACS URL and post (265) the SAML assertion to the SSO server 215.

The SSO server 215, having authenticated the user 105 sends (270) an instruction to the browser 205 to provide the authentication data to the federated wallet component 210. After receiving the redirect instructions with the authentication data, the browser 205 sends a new request (275) to fetch the federated wallet application corresponding to the user 105 from the federated wallet component 210. With the user 105 authenticated, the federated wallet component 210 may provide (280) the wallet interface for a federated wallet application to the browser 205. Additionally, the federated wallet component may provide (280) an SSO token (e.g., JavaScript Object Notation (JSON) Web Token (JWT) token) that indicates the authentication of the user identity and may be used to log in to services, such as crypto-wallets and other dapps. An SSO token may be information identifying the user and the system sending the SSO token. The SSO token may be digitally signed so that a receiver of the SSO token can verify that the SSO token is from a trusted source and thus also is an authentication of the user information in the SSO token.

Through the SSO process and authentication, the user 105 may access different wallets, or crypto-wallets, such as MetaMask™ by ConsenSys, Inc. or the Coinbase Wallet by Coinbase™. With the SSO session established, the user may open additional browser windows and direct the browser, such as by inputting a URL, to direct the browser to a wallet. The user 105 may not be prompted to login to the wallet based on the established SSO session and/or providing the SSO token. The wallet or service may validate the user 105 by providing the SSO token to the SSO server 215. Upon receiving a token, the SSO server 215 may provide a response indicating whether the provided token is valid.

Figure 3:
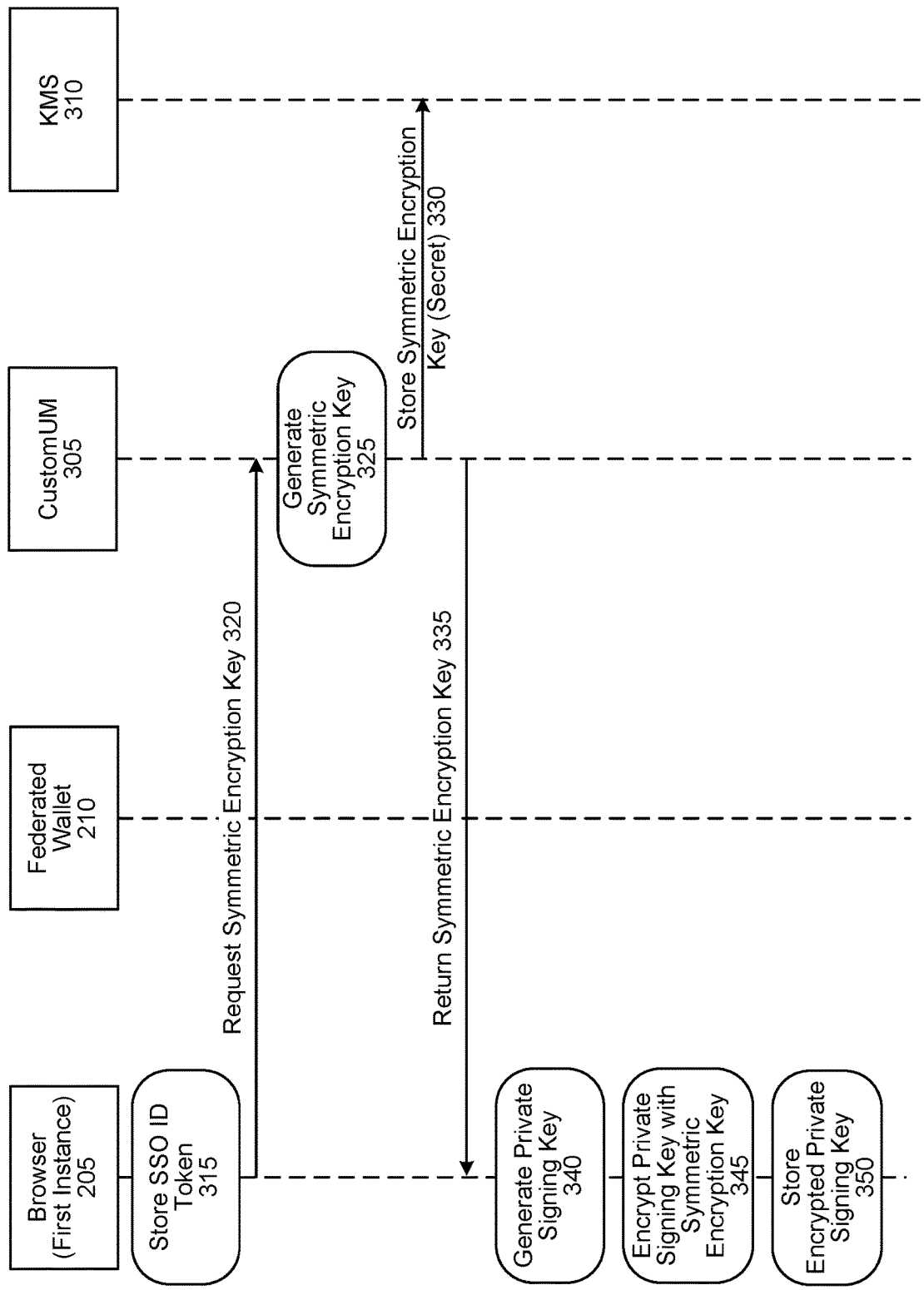
FIG. 3 illustrates an example process for generating a private signature key, in accordance with some embodiments.

FIG. 3 illustrates an example process for generating a private signature key, in accordance with some embodiments. After authenticating the user with the SSO process for the federated wallet, as described in reference to FIG. 2, a private signature key may be generated for the user to sign transactions, as described below in reference to FIG. 5. As described in reference to operation 280, the wallet component 210 may provide an SSO token 315 corresponding to the current authenticated SSO session for the user 105. The SSO token may be stored (315) by the browser 205 (e.g., saved to a memory location corresponding to the browser). The token (e.g., JWT token) may correspond to the established session (e.g., a time period beginning at the point of authentication) and the user identification (e.g., email address used during SSO).

The user 105 may then request (320) a symmetric encryption key for encrypting their private signing key. The browser 205 may send the request (320) for the symmetric encryption key to a CustomUM component 305 of the federated wallet system 120. The request (320) may include the SSO token. The CustomUM component 305 may receive the request and/or token and validate the user 105 based on the SSO token. Using the SSO token as a verification of the user 105 and the corresponding user identification, the CustomUM component 305 may generate (325) a symmetric encryption key (e.g., advanced encryption cypher (AES)), or secret, and assign the symmetric encryption key to the user identification. In some implementations, the CustomUM component 305 may send (330) the symmetric encryption key to the key management service (KMS) 310 to store the symmetric encryption key. A service, such as KMS 310, may adhere to a set of standards or rules for securing and managing encryption keys and/or other types of secrets.

The symmetric encryption key may be a rotating symmetric encryption key. On a timely basis (e.g., weekly, monthly, etc.), the CustomUM component 305 may generate a new symmetric encryption key. The data encrypted (e.g., signing keys) with the previous symmetric encryption key may be decrypted with the previous symmetric encryption key and then re-encrypted with the new symmetric encryption key. In some embodiments, the symmetric encryption key is also itself encrypted with a threshold encryption. The threshold encryption may require a minimum number of secrets (e.g., "t-out-of-N") from other users to decrypt the symmetric encryption key so that the symmetric encryption key may then be used for decrypting.

The CustomUM component 305 may return (335) the symmetric encryption key to the computing device 110 for receipt by the browser 205. By storing the symmetric encryption key at the KMS, the request (320) and return (335) of the symmetric encryption key may occur at a later point in time. For example, on a day following the generation (325) and storage (330) of the symmetric encryption key, the user may perform the SSO process described in reference to FIG. 2 and then request their symmetric encryption key from the KMS 310 via the CustomUM component 305.

The browser 205 may generate (340) a private signing key for the user 105 (e.g., session key initialization). The private signing key may be seeded using a digital certificate (e.g., public key infrastructure (PKI) digital certificate. The private signing key may be seeded using data or digital certificates stored on integrated circuit chip (e.g., common access card (CAC)). The private signing key may be used for signing blockchain transactions. A user 105 may have a Secret Recovery Phrase (SRP) corresponding to a particular crypto-wallet. The SRP may be twelve words that seed a user's digital identity and may be used to generate key(s) that grant access to the user's wallet. The SRP may be used to create and restore the particular wallet. The private signing key is what allows a user to access, or "unlock," their account on a blockchain. To prevent exposure of the private signing key, the private signing key is encrypted (345) using the symmetric encryption key. The private signing key may potentially be stolen if the private signing key is left in plain text (e.g., unencrypted). The encrypted private signing key is then stored (350) in the memory of the device corresponding to the browser 205. The encrypted private signing key may then be decrypted and accessed when requested for completing a transaction, as described below in reference to FIG. 5.

Through the authentication of the user 105 by the SSO process and receiving the session token corresponding to the SSO session, the user 105 is validated for simultaneously connecting to multiple dapps using a respective browser window for each dapp. Previously, without a federated wallet component 210 and the established SSO session, the user may have been required to reinitialize the private signing key for each session established from a dapp connection.

In some embodiments, the symmetric encryption key and private signing key do not need to be generated and the user may instead use another mechanism such as their Common Access Card (CAC), such as those used by the United States government agencies, including the Department of Defense. A CAC may be a smart card that includes an encrypted private signing key that a user may use for accessing their blockchain accounts and signing transactions.

Figure 4:
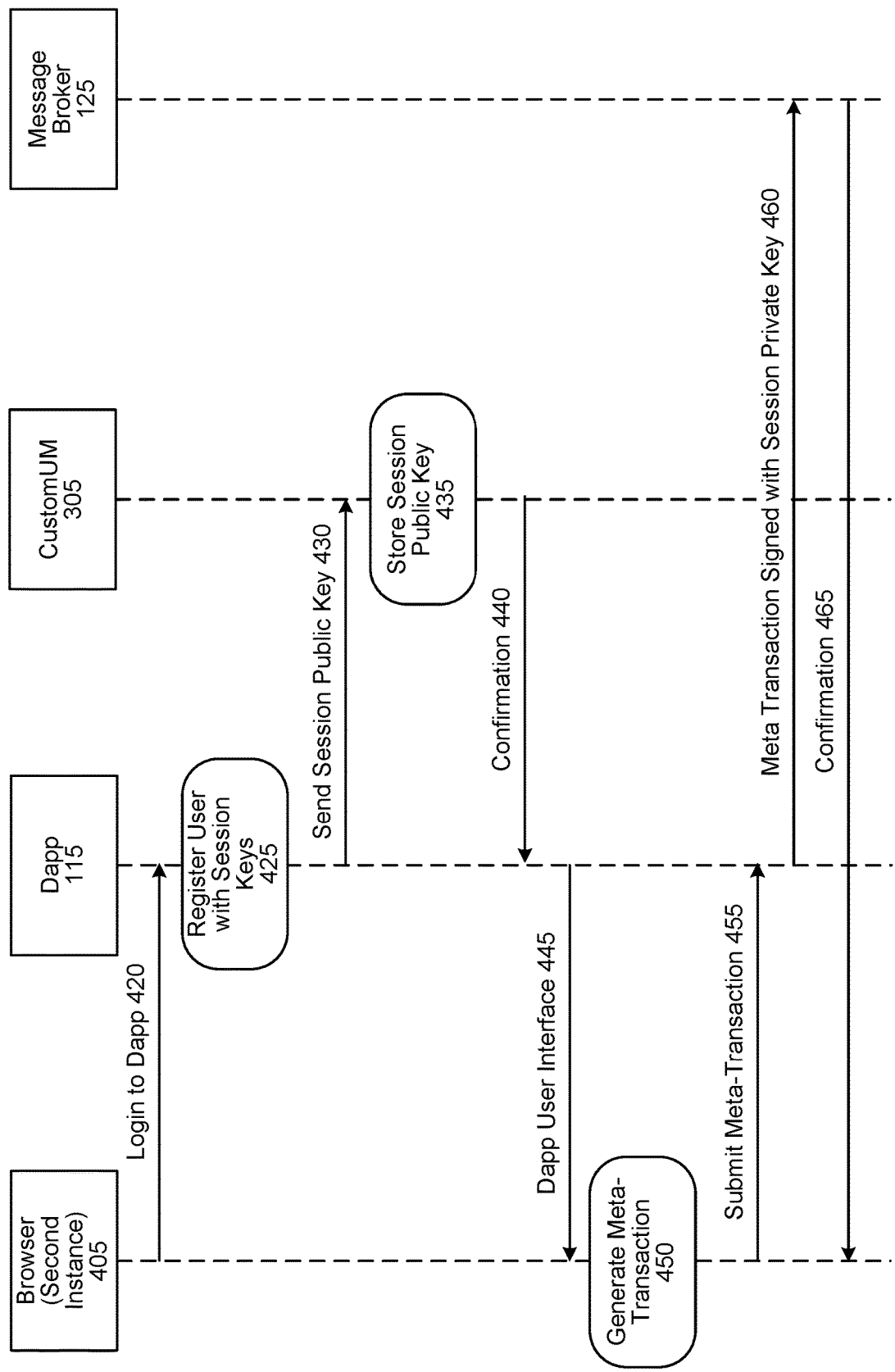
FIG. 4 illustrates an example process for creating a meta-transaction under the federated wallet, in accordance with some embodiments.

FIG. 4 illustrates an example process for creating a meta-transaction under the federated wallet, in accordance with some embodiments. As previously noted, based on establishing a session through the SSO process and receiving one or more session tokens, the user 105 is validated for the device 110 and may initialize sessions with one or more dapps. The user 105 may open a second browser 405 and enter a URL for a particular dapp 115 (e.g., UniSwap®). As illustrated in FIG. 4, the second browser 405 may request to login (420) to the dapp 115 and provide the session token to authenticate themselves.

The dapp 115 may generate and register (425) the user 105 with a session public key and corresponding session private key. The session public key corresponds to the user 105 and dapp 115 and may be used as a type of identifier for the session the user 105 has established with the dapp 115 and corresponding to the user's wallet. The dapp 115 may send (430) the session public key to the CustomUM component 305. The CustomUM component 305 may store (435) the session public key.

The CustomUM component 305 may use the session public key to confirm messages (e.g., transactions) received from the dapp 115 corresponding to the user 105 are valid requests and prevent any attempts to hijack the session. For example, a malicious dapp may send messages to users that have never used the malicious dapp. Should a recipient of the messages from the malicious dapp accidentally or inadvertently respond to one of the messages, the CustomUM component 305 may prevent any actions corresponding to the messages from the malicious dapp from proceeding as the CustomUM component 305 does not have a session public key corresponding to the malicious dapp and user 105 stored.

Additionally, the CustomUM component 305 may store dapp allowlists and blocklists corresponding to a particular user 105. For example, a user 105 may mistype the URL for a particular dapp, such as typing "example-dapp" instead of "example-dapp". Mistyped URLs may be directed toward malicious dapps that spoof the dapp intended by the user 105. The user 105 may unknowingly generate messages and meta-transactions using the malicious dapp. However, the messages may be intercepted by the CustomUM component 305 where the URL of the malicious dapp may be compared to the allowlist and/or blocklist. The CustomUM component 305 may prevent any further actions corresponding to the malicious dapp from proceeding.

In some embodiments, the CustomUM component 305 may provide a confirmation (440) to the dapp 115 that the session public key is stored and the dapp 115 may proceed with the session for the user 105. The dapp 115 may then provide (445) a user interface (e.g., the code to render a graphical user interface) to the second browser 405.

The user 105 may perform various functions and actions provided by the dapp 115. Specifically, the user 105 may generate (450) a meta-transaction. A meta-transaction may include all or some portions of the same information as a blockchain transaction, however the meta-transaction is not signed, such as with the private signing key, by the user 105. The user 105 may wish to batch a set of meta-transactions that are all signed and submitted to the blockchain at the same time.

The user 105 may submit (455), via the second browser 405, the meta-transaction. The dapp 115 may sign the meta-transaction with the session private key and send (460) the session signed meta-transaction to the message broker 125. The session private key representing the session established for the user 105 and the dapp 115, and corresponding to the session public key. In some embodiments, the meta-transaction may be encrypted using the session keys. In some embodiments, the queue of meta-transactions for one or more users may be a message broker 125. In other embodiments, the queue may be stored in a database associated with the CustomUM component 305 and/or the federated wallet component 210. The meta-transactions may be stored in queue based on the session public key and/or a dapp session identifier and a user identifier. The meta-transactions stored in the message broker 125 may be encrypted, such as with the session keys, to prevent others from accessing and learning the content of the pending meta-transactions. In some embodiments, the dapp 115 may communicate directly with the message broker 125 to prevent the dapp 115 from direct communication with the wallet and thus preventing a potential malicious dapp from access the user's wallet. The message broker 125 may provide a confirmation (465) to the dapp 115, and viewable via the second browser 405, that the meta-transaction has been added to the queue of the message broker 125.

The operations described in reference to FIG. 4 may be performed for one or more meta-transactions that correspond to one or more dapps. The meta-transactions may be stored (e.g., queued) by the message broker 125 corresponding to the user 105, such as based on a user identification or the SSO token (e.g., an identifier corresponding to the SSO token).

Figure 5:
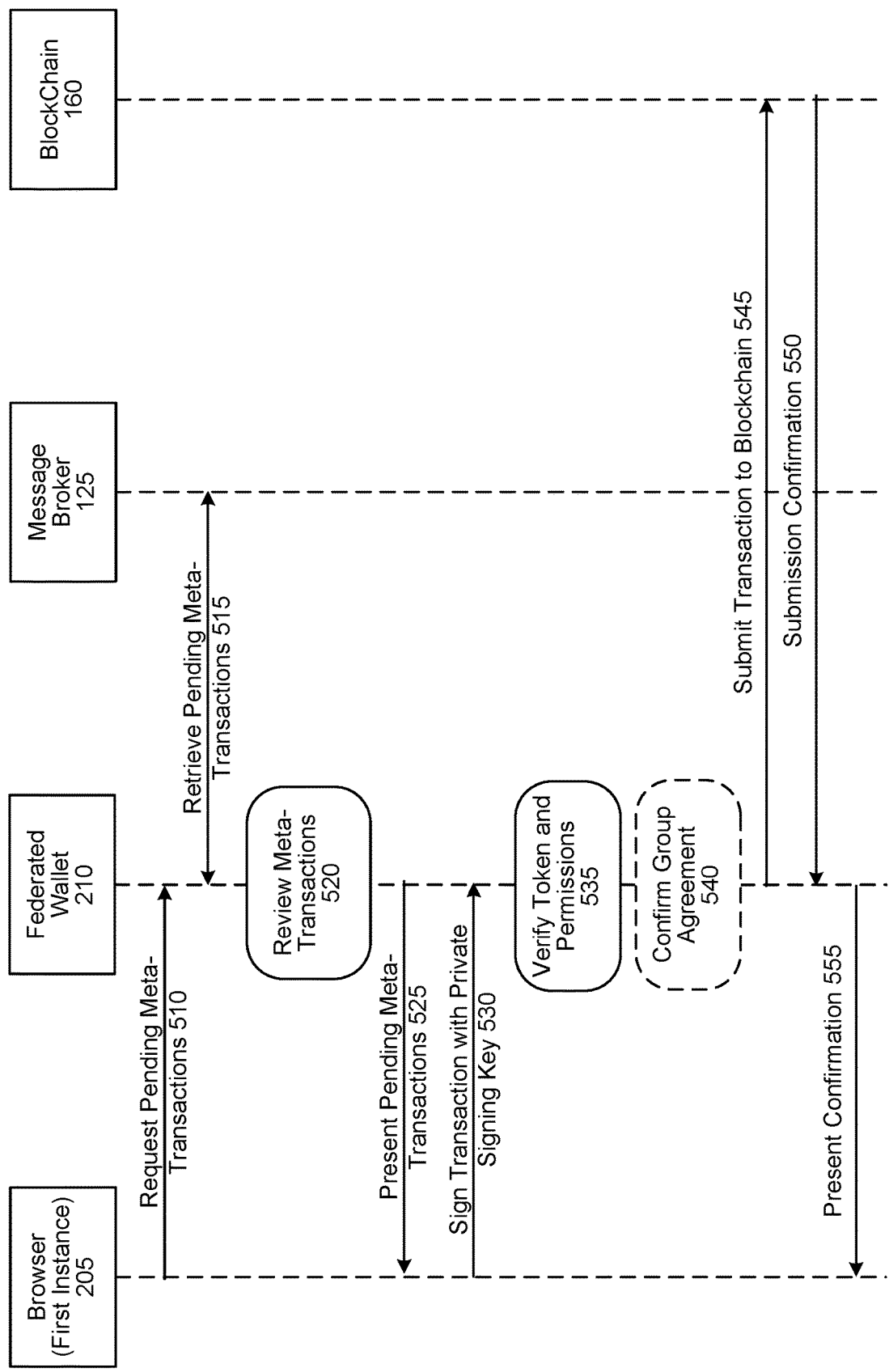
FIG. 5 illustrates an example process for signing and executing transactions with the federated wallet, in accordance with some embodiments.

FIG. 5 illustrates an example process for signing and executing transactions with the federated wallet, in accordance with some embodiments. When the user 105 is ready to sign and execute the one or more pending meta-transactions queued in the message broker 125, the user 105 may request (510) to view the pending meta-transactions, via the browser 205 of the user device 110, from the federated wallet component 210. The federated wallet component 210 may retrieve (515), from the message broker 125, the pending meta-transactions corresponding to the user 105. In some embodiments, the browser 205 may be a third browser of the user device 110. The user 105 may be authenticated via the third browser using the SSO process described in reference to FIG. 2.

The federated wallet component 210 may receive the pending meta-transactions from the message broker 125 and review (520) the meta-transactions for validity. The federated wallet component 210 may use one or more public session keys corresponding to dapp sessions initiated by the user 105, such as the session key generated at operation 425 and stored by the federated wallet component 210 at operation 435. The public session key may identify the user 105 and the dapp 115 and is generated based on the user 105 being authorized through the SSO process. Thus, the session public key is an indication of the validity of a meta-transaction corresponding to both the dapp 115 and the user 105. As described in reference to operation 460, the meta-transactions submitted to the message broker 125 are signed with the session private key. The federated wallet component 210 may then verify the meta-transactions using the corresponding session public key. The review (520) to validate the meta-transactions may prevent the signing and possible submission of fraudulent transactions. For example, should a malicious dapp generate fraudulent meta-transactions for the user 105 and add the fraudulent meta-transactions to the message broker 125, when the federated wallet component 210 reviews (520) the fraudulent meta-transaction, the federated wallet component 210 may determine that the fraudulent meta-transaction is not signed with the private session key corresponding to at least one of the public session keys stored by the federated wallet component 210 and corresponding to the user 105. Additionally, the federated wallet component 210 may review transactions that may correspond to fraudulent dapps. The federated wallet system may maintain a database of fraudulent or malicious dapps and use the database to identify fraudulent meta-transactions.

Once the federated wallet component 210 has reviewed the queued meta-transactions from the message broker 125 to determine valid meta-transactions based on at least the public session key, the federated wallet component 210 may present (525) the pending meta-transactions to the user 105 via the browser 205. The user 105 may select one or more of the pending meta-transactions to sign (530) with the private signing key. The encrypted private signing key, that was stored at operation 350, may be decrypted using the symmetric encryption key. In some embodiments, the device 110 may receive the symmetric encryption key from the KMS 310 or from the KMS 310 via the federated wallet component 210. The federated wallet component 210 may receive the one or more signed transactions and verify (535) the transactions using the public signing key corresponding to the private signing key of the user 105 and/or the SSO token as previously established in operation 315.

The message broker 125 combined with the federated wallet component 210 (e.g., federated wallet) allows for the display the pending meta-transactions across multiple devices (e.g., laptop, tablet, mobile phone, etc.). For example, if the user 105 utilizes a second device different from device 110, the user 105 may access the federated wallet on the second device after performing the SSO process described in reference to FIG. 2. The federated wallet displayed on the second device may present the same pending meta-transactions for the user 105.

In some embodiments, the SSO token may be used by the CustomUM component 305 to determine the signing and submission permissions of the user 105. For example, if the user 105 is part of an organization and is generating transaction on behalf of the organization, the SSO token (as provided from the organization's SSO) may indicate the permissions for the user 105. The SSO token may indicate, such as based on position/role, that the user 105 does not have permission to submit transactions.

In some embodiments, submitting transactions, such as indicated by the SSO token, may require a consensus or minimum number of approvals (e.g., t-out-of-n). As described below in reference to FIG. 6, approval may be requested from one or more other users. The federated wallet component 210 may confirm (540) the number of approvals for the transaction meets or exceeds an approval threshold. The federated wallet component 210 may prevent the transaction submission from proceeding until the requisite number of approvals are received.

After verifying (535) the SSO token and, if required, confirming (540) group approval, the federated wallet component 210 may submit (545) the transaction to the blockchain 160. In some embodiments, the blockchain 160 may be a smart account, such as for an organization, and the transaction submission corresponds to execution of a smart contract. In some embodiments, the blockchain 160 may be an API and the transaction submission corresponds to a submission or interaction with the API. The blockchain 160 may provide a confirmation (550) of the transaction submission to the federated wallet component 210. The federated wallet component 210 may then present (555) the submission confirmation to the user 105 via the browser 205.

In some embodiments, the user 105 may use a second device, and a browser of the second device, to access the federated wallet component 210 and request the pending meta-transactions. The user 105 may be authenticated using the SSO process for the second device and similar to the SSO process described in reference to FIG. 2. The second device may receive at least one SSO token corresponding to at least one browser of the second device (and similar to operation 280) based on the authentication of the user 105 at the second device. In some embodiments, the second device may then receive the pending meta-transactions and be used to sign the pending meta-transactions with the user's private signing key, as described in reference to the operations of FIG. 5.

Figure 6:
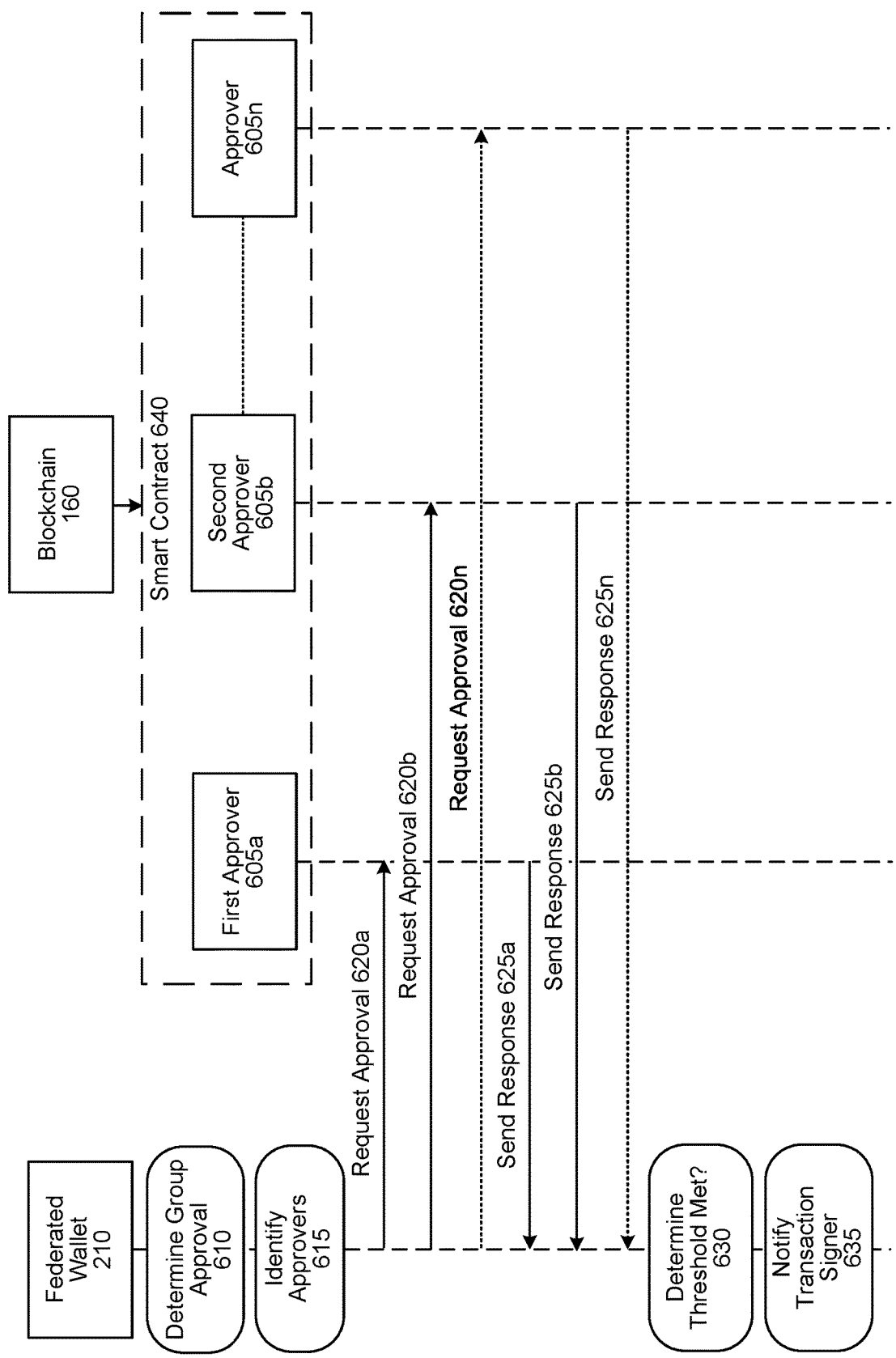
FIG. 6 illustrates an example process for group approval for executing transactions with the federated wallet, in accordance with some embodiments.

FIG. 6 illustrates an example process for group approval for executing transactions with the federated wallet, in accordance with some embodiments. As shown with operation 540 in FIG. 5, the federated wallet component 210 may, in some embodiments, confirm a group agreement for submitting the transaction. The federated wallet component 210 may determine (610) that a particular signed transaction, such as a signed transaction received at operation 530 requires a group approval, where the group may be one or more other users than the signing user 105. Determining the transaction required group approval may be based on factors such as the type of transaction, the signing user, characteristic of the signing user, the position or role of the signing user, an organization wide policy, etc. In some embodiments, providing approval may be providing an indication (e.g., approve or deny) through a software application or communication, such as shown in the action review interface 725 of FIG. 7. In some embodiments, providing approval may require a signature (e.g., private signing key) from the one or more approvers. Similar to operation 530 of the user 105 signing the meta-transaction using their private signing key, the transaction may only be ready for submission to the blockchain 160 once the requisite approvers have also signed the transaction with their private signing key.

The federated wallet component 210 may identify (615) a set of approvers for the transaction. The set of approvers for the transaction may be a general group, such as a designated group or board within an organization, or may be a particular set of users/members dependent upon factors such as the type of transaction or the parties involved in the transaction (e.g., the user 105, a recipient, etc.). The set of approvers may be based on a characteristic of the approver, such as position or role within an organization, age, skills, certifications, etc. For example, the transaction may require one approval by a person with a characteristic of holding a manager position, thus not requiring a specific person, but any individual that is a manager for the organization.

The set of approvers may be identified as part of a smart contract 640. The smart contract 640 may be stored and executed as part of a blockchain 160, where the blockchain may or may not be the same blockchain that received the transaction submission as described in reference to FIG. 5. The smart contract 640 may be a program that is stored on the blockchain 160 and is executed when certain predetermined conditions are met. For example, the smart contract 640 may include a condition that at least three approvals are required for the smart contract 640 to execute (e.g., allow the transaction submission to proceed). In another example, the smart contract 640 may include a requirement that approval is received from a specific set of approvers (e.g., first approver 605a and second approver 605b).

The federated wallet component 210 may request (620a-620n) approval for the transaction from the one or more approvers 605a-605n identified as the set of approvers for the transaction. The approvers 605a-605n may receive a notification via the federated wallet 210 and displayed in respective approver's browser or wallet application. The notification may include information about the transaction and the requesting signer (e.g., user 105). The respective approvers 605a-605n may send (625a-625n) a response to the approval request back to the federated wallet component 210. The response may indicate whether the particular approver approves or rejects the submission of the transaction.

The federated wallet component 210 may determine an approval threshold. The approval threshold may indicate the minimum number of approvals required for the transaction to be submitted. Similar to determining the set of approvers, the approval threshold may be a general threshold or a threshold determined based on factors such as the type of transaction or the characteristics of the user 105. The federated wallet component 210 may determine (630) if the number of received responses 625a-625n that indicate approval for the transaction meet and/or exceeds the approval threshold value. The group approval process may have a time limit (e.g., one hour, twelve hours, etc.) for receiving responses. If the number of responses indicating approval received within the time limit does not meet the approval threshold, then the transaction may be rejected. The federated wallet component 210 may provide a notification (635), such as via the wallet displayed by browser 205, to the signer (e.g., user 105) indicating whether the transaction was approved for submission. If the federated wallet component 210 determines (630) that the number of responses indicating approval meets or exceeds the approval threshold, the federated wallet component 210 may provide a notification indicating the transaction was approved and then proceeding to submit (545) the transaction to the blockchain 160. If the federated wallet component 210 determines (630) that the number of responses indicating approval does not meet the approval threshold (e.g., the number of rejections prevent meeting the approval threshold or the time limit lapses before the approval threshold is met), the federated wallet component 210 may provide a notification indicating the transaction was not approved. Based on the rejection determination, the signing and submission process described in reference to FIG. 5 may then end and federated wallet component 210 may not submit the transaction.

Figure 7:
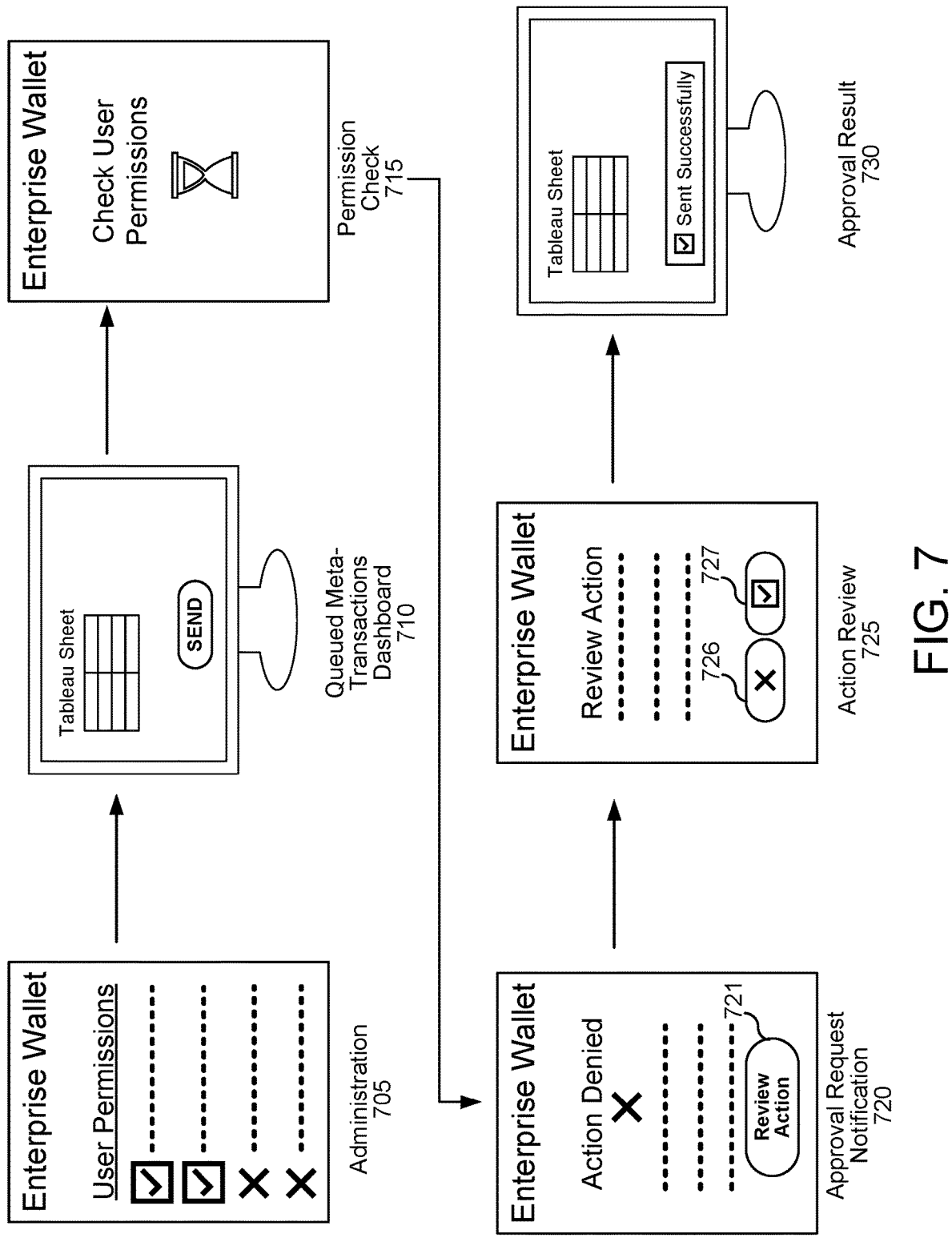
FIG. 7 illustrates example user interfaces for the process of group approval with the federated wallet, in accordance with some embodiments.

FIG. 7 illustrates example user interfaces for the process of group approval with the federated wallet, in accordance with some embodiments. As described in reference to FIG. 6, the submission of a transaction using the federated wallet may include requirements to receive group approval before proceeding.

An administrator for the federated wallet, such as a federated wallet for an organization, may access and administration interface 705 to set up user permissions and define an approval group for review of actions (e.g., transactions). The administration interface 705 may include designating the types of actions a particular user 105 has permission to perform. Additionally, the administration interface 705 may include identifying the members of the approval group, determining the types of actions requiring approval from the approval group, and determining the approval threshold.

In some embodiments, the administrator may withhold or completely revoke signing capabilities from a user 105, such as if the user is no longer employed by an organization. The public signing key corresponding to the user's private signing key may be added to a blocklist. Then, the federated wallet component 210 may identify, using the public signing key, any transactions that are signed with the private signing key of the blocked user.

The user 105 may view in their browser 205 the queued and pending meta-transactions dashboard 710, similar to operation 525 of FIG. 5. The pending meta-transactions dashboard 710 may present the sanitized pending meta-transactions to the user 105, where sanitizing may include obfuscating, removing, and/or formatting data to prepare the data (e.g., transactions) before the data is transferred from a secret network (e.g., internal to an organization using the federated wallet) to an unclassified network (e.g., the blockchain 160).

As described above, the federated wallet may provide for a user to access the federated wallet from multiple devices. The user 105 may review the sanitized meta-transactions on the pending meta-transactions dashboard 710 from a first device (e.g., desktop computer) and then request submission of the pending transactions from a second device (e.g., mobile phone). The user 105 may request submission of the pending transactions and the federated wallet may perform a permission check 715 for the user 105, such as based on the permissions designated by the administrator using the administration interface 705.

The federated wallet may determine the user 105 does not have permission for the requested transaction submission. An approver from the approval group may receive an approval request notification 720. The approval request notification 720 may indicate that a request action (e.g., transaction submission) was denied based on the permission check 715. The approval request notification 720 may include review button 721 for the approver to select and review the requested action. Selecting the review button 721, the approver may be presented with an action review interface 725. The action review interface 725 may include information about the requested action, such as the parties involved, the assets of the transaction, etc., and the requestor (e.g., user 105). Additionally, the action review interface 725 may include a deny button 726 and an approve button 727 for the approver to select and provide their approval or denial for the requested action. The federated wallet may log the approver's response on the blockchain 160 as an immutable, auditable record that does not require manual record keeping.

The requestor (e.g., user 105) may receive a notification (e.g., email, wallet notification, etc.) that that the requested action has been approved (or denied) and the approval result 730 may be displayed on a wallet dashboard. After approval, the members of the approval group may be notified that the action is approved (or denied) and the requested action is completed.

Figure 8:
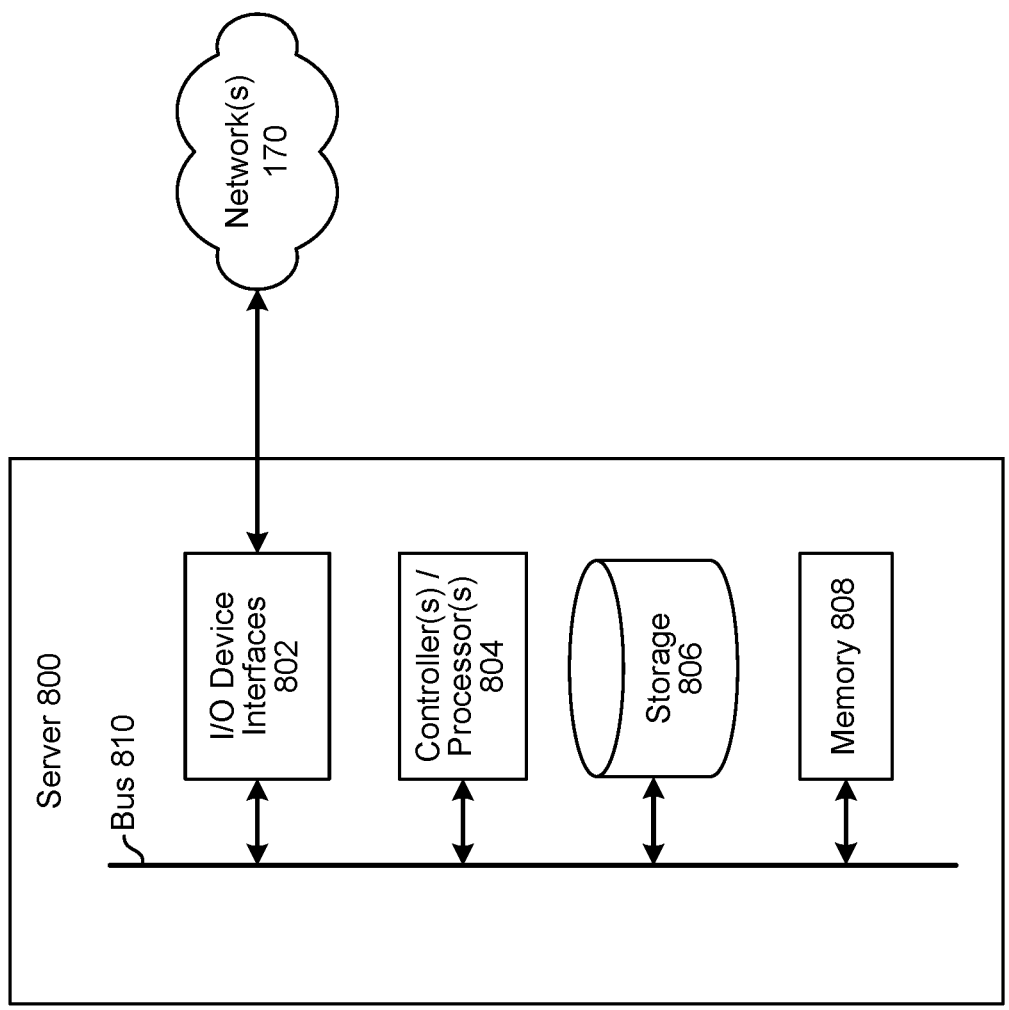
FIG. 8 illustrates components of a system according to embodiments of the present disclosure.

FIG. 8 is a block diagram illustrating a computing environment that includes a server 800; the server 800 may be the federated wallet system 120 and/or the blockchain 160. The server 800 may include one or more physical devices and/or one or more virtual devices, such as virtual systems that run in a cloud server or similar environment. The server 800 may include one or more input/output device interfaces 802 and controllers/processors 804. The server 800 may further include storage 806 and a memory 808. A bus 810 may allow the input/output device interfaces 802, controllers/processors 804, storage 806, and memory 808 to communicate with each other; the components may instead or in addition be directly connected to each other or be connected via a different bus.

A variety of components may be connected through the input/output device interfaces 802. For example, the input/output device interfaces 802 may be used to connect to the network 170. Further components include keyboards, mice, displays, touchscreens, microphones, speakers, and any other type of user input/output device. The components may further include USB drives, removable hard drives, or any other type of removable storage.

The controllers/processors 804 may processes data and computer-readable instructions and may include a general-purpose central-processing unit, a specific-purpose processor such as a graphics processor, a digital-signal processor, an application-specific integrated circuit, a microcontroller, or any other type of controller or processor. The memory 808 may include volatile random access memory (RAM), non-volatile read only memory (ROM), non-volatile magnetoresistive (MRAM), and/or other types of memory. The storage 806 may be used for storing data and controller/processor-executable instructions on one or more non-volatile storage types, such as magnetic storage, optical storage, solid-state storage, etc.

Computer instructions for operating the server 800 and its various components may be executed by the controller(s)/processor(s) 804 using the memory 808 as temporary "working" storage at runtime. The computer instructions may be stored in a non-transitory manner in the memory 808, storage 806, and/or an external device(s). Alternatively, some or all of the executable instructions may be embedded in hardware or firmware on the respective device in addition to or instead of software.

Figure 9:
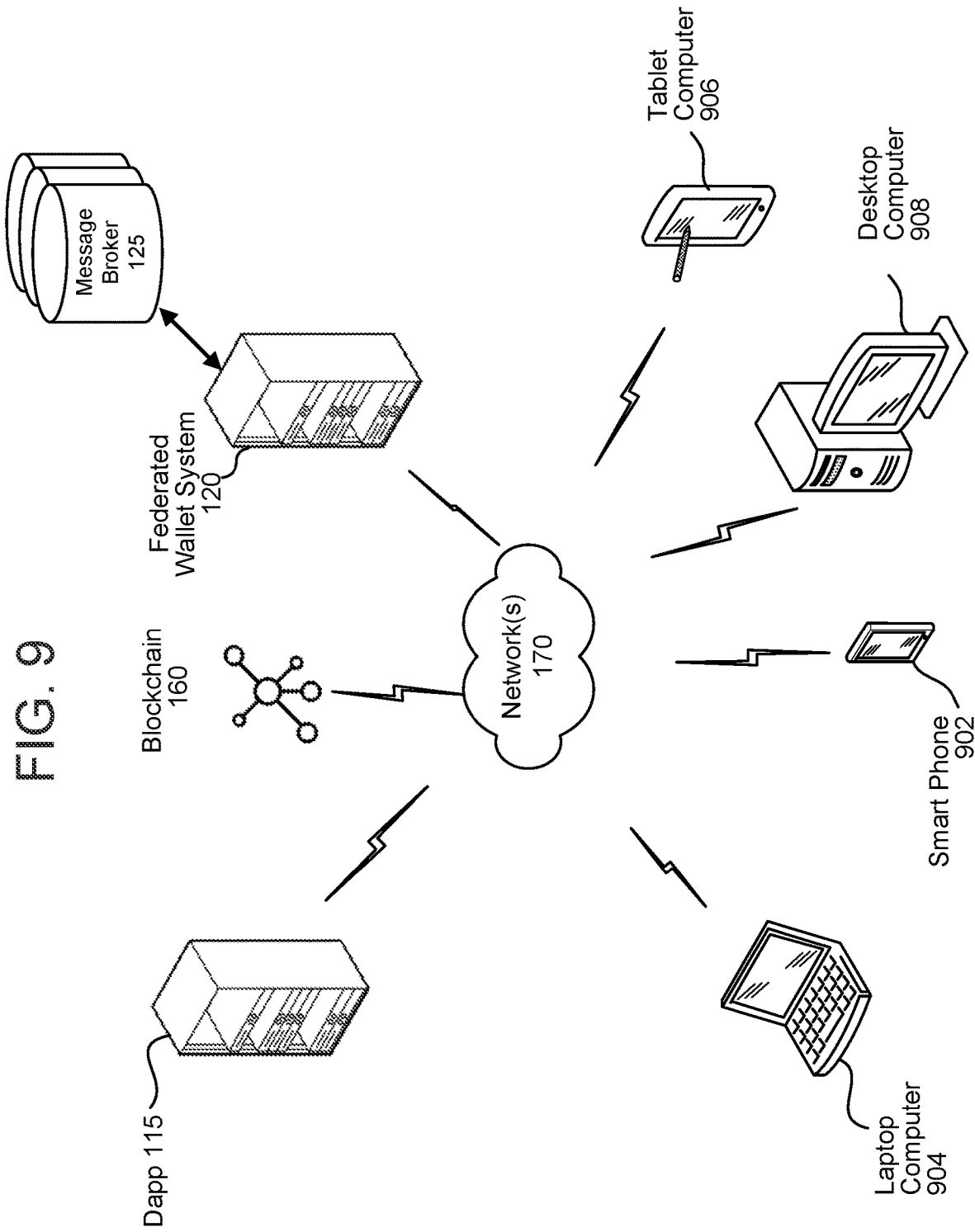
FIG. 9 illustrates a network according to embodiments of the present disclosure.

FIG. 9 illustrates a number of devices 110 in communication with the federated wallet system 120 using the network 170. The devices 110 may include a smart phone 902, a laptop computer 904, a tablet computer 906, and/or a desktop computer 908. These devices 110 may be used to remotely access the federated wallet system 120 to perform any of the operations described herein.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and data processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A system comprising:
at least one processor; and
at least one memory including instructions that, when executed by the at least one processor, cause the system to:
receive first data representing a session public key corresponding to a first decentralized application and a first user;
receive second data representing an unsigned transaction of a blockchain and corresponding to the first user;
determine, using the session public key and the second data, that the unsigned transaction is valid;
receive third data representing a signed transaction, wherein the signed transaction corresponds to the unsigned transaction signed by a private signing key associated with the first user;
receive fourth data representing an approval, corresponding to a second user, for the unsigned transaction;
determine, based on at least the fourth data, a number of approvals corresponding to the unsigned transaction;
determine the number of approvals satisfies an approval threshold corresponding to the second data; and
send, to at least one device associated with the blockchain, the third data.

2. The system of claim 1, wherein the at least one memory further includes instructions, that, when executed by the at least one processor, further cause the system to:
prior sending the third data, determine an approval condition corresponding to the second data, wherein the approval condition corresponds to an approver characteristic;
receive fifth data representing an approval for the unsigned transaction and corresponding to a third user;
determine, based on at least the fifth data, a first characteristic of the third user; and
determine the first characteristic corresponds to the approver characteristic.

3. The system of claim 1, wherein the at least one memory further includes instructions, that, when executed by the at least one processor, further cause the system to:
receive a first request from a first device to access an account of the first user, the account corresponding to the blockchain;
determine first authentication data of the first user;
generate, based on the first authentication data of the first user, a first token corresponding to a first browser of the first device; and
send the first token to the first device.

4. The system of claim 3, wherein the second data representing the unsigned transaction is received from the first device and the at least one memory further includes instructions, that, when executed by the at least one processor, further cause the system to store the second data in a database.

5. The system of claim 4, wherein the at least one memory further includes instructions, that, when executed by the at least one processor, further cause the system to:
receive a second request from a second device to access the account of the first user;
determine second authentication data for the first user;
receive, from the second device, a third request corresponding to the second data;
retrieve the second data from the database; and
send the second data to the second device,
wherein the third data is received from the second device.

6. The system of claim 5, wherein the at least one memory further includes instructions, that, when executed by the at least one processor, further cause the system to:
generate a symmetric encryption key;
send, to the first device, the symmetric encryption key; and
in response to receiving the third request from the second device, send, to the second device, the symmetric encryption key.

7. The system of claim 3, wherein the first request is generated from the first browser of the first device and the at least one memory further includes instructions, that, when executed by the at least one processor, further cause the system to:
generate, based on the first authentication data of the first user, a second token corresponding to a second browser of the first device;
send the second token to the first device;
receive, from the second browser of the first device, the third data and the second token;
receive a public signing key corresponding to the private signing key; and
determine, using the public signing key, the third data corresponds to the first user.

8. The system of claim 1, wherein the at least one memory further includes instructions, that, when executed by the at least one processor, further cause the system to:
receive, from a database, fifth data representing a second unsigned transaction of the blockchain corresponding to the first user;
determine, using the session public key, the second unsigned transaction is invalid;
generate notification data representing a notification corresponding to the second unsigned transaction; and
send, to a first device of the first user, the notification data.

9. The system of claim 1, wherein the at least one memory further includes instructions, that, when executed by the at least one processor, further cause the system to:
receive, from a database, fifth data representing a second unsigned transaction of the blockchain corresponding to the first user;
receive sixth data representing a blocklist for decentralized applications;
determine, using the sixth data, the second unsigned transaction is invalid;
generate notification data representing a notification corresponding to the second unsigned transaction; and
send, to a first device of the first user, the notification data.

10. A computer-implemented method comprising:
sending, using a first device, first data representing a first authentication request for a first user of the first device;
receiving a symmetric encryption key corresponding to the first user;
receiving a first token corresponding to a first authentication of the first user;
generating a private signing key, wherein the private signing key is seeded using a digital certificate;
determining, using the symmetric encryption key and the private signing key, an encrypted private signing key;

receiving first data representing an unsigned transaction corresponding to a decentralized application and the first user;

decrypting, using the symmetric encryption key, the encrypted private signing key to determine the private signing key;

determining, using the first data and the private signing key, second data representing a signed transaction corresponding to the unsigned transaction; and sending the second data and the first token.

11. The computer-implemented method of claim 10, further comprising:

sending, using a second device, third data representing a second authentication request for the first user;

receiving a second token corresponding to a second authentication of the first user; and receiving, at the second device, the private signing key, wherein determining the second data at the second device and wherein sending the second data from the second device.

12. The computer-implemented method of claim 10, further comprising:

in response to determining the encrypted private signing key, removing the symmetric encryption key from the first device; and after receiving the first data, receiving the symmetric encryption key.

13. A computer-implemented method comprising:

receiving first data representing a session public key corresponding to a first decentralized application and a first user;

receiving second data representing an unsigned transaction of a blockchain and corresponding to the first user;

determining, using the session public key and the second data, that the unsigned transaction is valid;

receiving third data representing a signed transaction, wherein the signed transaction corresponds to the unsigned transaction signed by a private signing key associated with the first user;

receiving fourth data representing an approval, corresponding to a second user, for the unsigned transaction;

determining, based on at least the fourth data, a number of approvals corresponding to the unsigned transaction;

determining the number of approvals satisfies an approval threshold corresponding to the second data; and sending, to at least one device associated with the blockchain, the third data.

14. The computer-implemented method of claim 13, further comprising:

prior sending the third data, determining an approval condition corresponding to the second data, wherein the approval condition corresponds to an approver characteristic;

receiving fifth data representing an approval for the unsigned transaction and corresponding to a third user;

determining, based on at least the fifth data, a first characteristic of the third user; and determining the first characteristic corresponds to the approver characteristic.

15. The computer-implemented method of claim 13, further comprising:

receiving a first request from a first device to access an account of the first user, the account corresponding to the blockchain;

determining first authentication data of the first user;

generating, based on the first authentication data of the first user, a first token; and sending the first token to the first device.

16. The computer-implemented method of claim 15, further comprising:

generating a symmetric encryption key;

sending, to the first device, the symmetric encryption key; and in response to receiving a third request, from a second device and corresponding to the second data, sending, to the second device, the symmetric encryption key.

17. The computer-implemented method of claim 15, further comprising:

receiving a second request from a second device to access the account of the first user;

determining second authentication data for the first user;

receiving, from the second device, a third request corresponding to the second data; and sending the second data to the second device, wherein the third data is received from the second device.

18. The computer-implemented method of claim 15, wherein the first request is generated from a first browser of the first device and further comprising:

generating, based on the first authentication data of the first user, a second token corresponding to a second browser of the first device;

sending the second token to the first device;

receiving, from the second browser of the first device, the third data and the second token;

receiving a public signing key corresponding to the private signing key; and determining, using the public signing key, the third data corresponds to the first user.

19. The computer-implemented method of claim 13, further comprising:

receiving, from a database, fifth data representing a second unsigned transaction of the blockchain corresponding to the first user;

determining, using the session public key, the second unsigned transaction is invalid;

generating notification data representing a notification corresponding to the second unsigned transaction; and sending, to a first device of the first user, the notification data.

20. The computer-implemented method of claim 13, further comprising:

receiving, from a database, fifth data representing a second unsigned transaction of the blockchain corresponding to the first user;

receiving sixth data representing a blocklist for decentralized applications;

determining, using the sixth data, the second unsigned transaction is invalid;

generating notification data representing a notification corresponding to the second unsigned transaction; and sending, to a first device of the first user, the notification data.

* * * * *